May 7, 1940.　　　C. H. McRAVEN　　　2,199,466
PNEUMATIC TIRE
Filed June 9, 1938　　　2 Sheets-Sheet 1

WITNESSES:

C. H. McRaven INVENTOR.

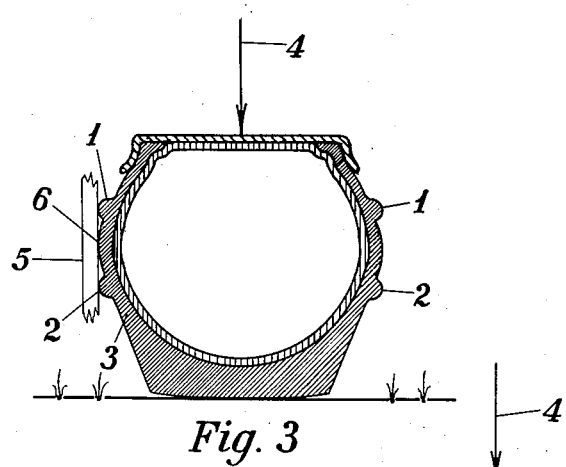
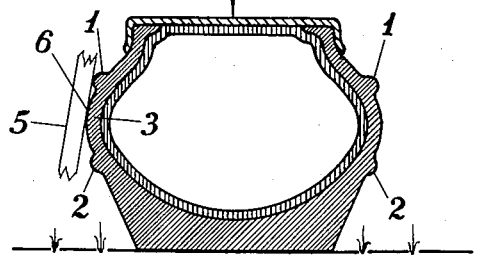
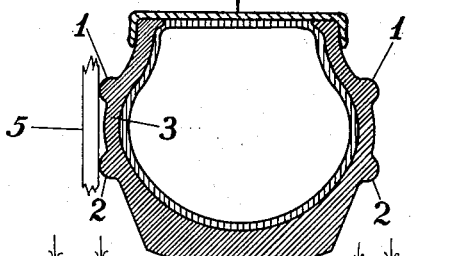
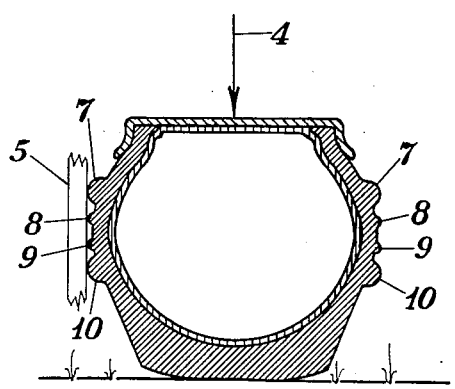
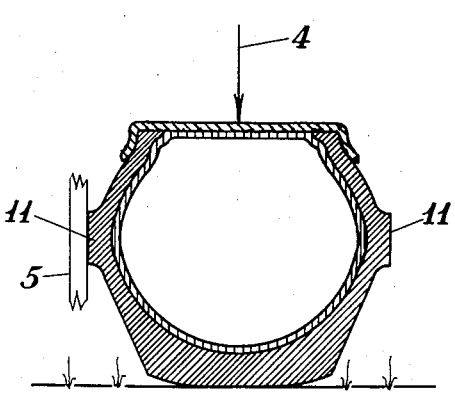

Patented May 7, 1940

2,199,466

UNITED STATES PATENT OFFICE 2,199,466

PNEUMATIC TIRE

Charles Hampton McRaven, Houston, Tex.

Application June 9, 1938, Serial No. 212,659

8 Claims. (Cl. 152—353)

This invention relates generally to any flexible foundation and more particularly to pneumatic tires designed for mounting on the rim of a wheel and inflation with air or other gases for the purpose of supporting a weight, and has for its principal object the provision of means for visually determining when the pressure within a tire is the correct value for most satisfactory operation.

Another object of this invention is the provision of means for visually determining when the pressure within a tire is less than it should be for most satisfactory operation.

Another object of this invention is the provision of means for visually determining when the pressure within a tire is more than it should be for most satisfactory operation.

Another object of this invention is the provision of means for visually determining the pressure within a tire when the load is known.

Another object of this invention is the provision of means for visually determining the load supported by a resilient tire.

Another object of this invention is the provision of means for accomplishment of the above results without the use of mechanical devices.

A further object of this invention is to provide a simple, effective, and practical means for accomplishment of the aforementioned results.

With the above and other objects in view which will appear in the description, my invention resides in a novel construction, combination, and arrangement of parts as hereinafter described and more particularly defined by the appended claims, it being understood that such changes as come within the scope of the claims may be made in the embodiment herein disclosed.

Referring to the drawings herewith,

Figure 3 is a cross sectional view of the deformed portion of a tire, in contact with the ground, when the tire is properly inflated and is supporting a load.

Figure 4 is a cross sectional view of the deformed portion of a tire, in contact with the ground, when the tire is under inflated and is supporting a load.

Figure 5 is a cross sectional view of the deformed portion of a tire, in contact with the ground, when the tire is over inflated and is supporting a load.

Figure 6 is another cross sectional view of the deformed portion of a tire, in contact with the ground, when the tire is properly inflated and is supporting a load.

Figure 7 is another cross sectional view of the deformed portion of a tire, in contact with the ground, when the tire is properly inflated and is supporting a load.

Figure 2:
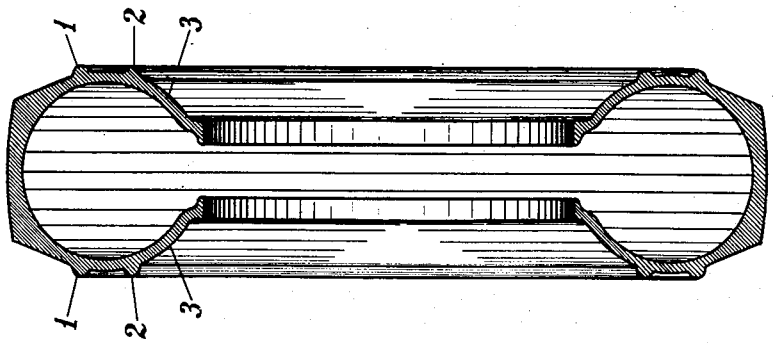
Figure 2 is a cross sectional view of a tire.
Figure 1:
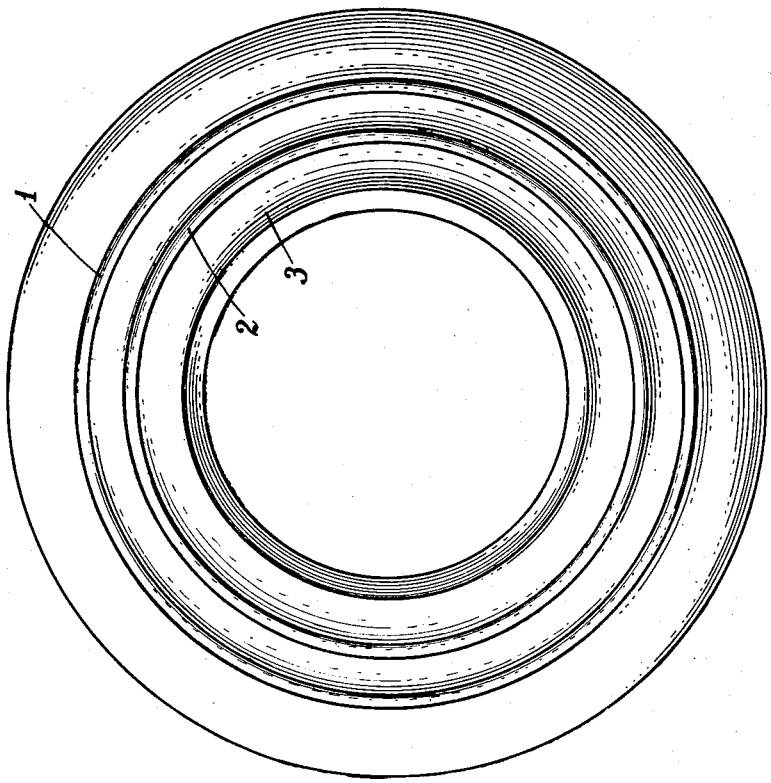
Figure 1 is a side elevational view of a tire.

Referring now in more detail to the drawings, my invention consists of circular strip 1 and circular strip 2, Figures 1, 2, 3, 4, and 5, concentrically located on the outer surface of one or both side walls 3. Strips 1 and 2 project from the outer surface of the side walls and the distance between them is such that when the tire is supporting a load 4 and is properly inflated, a straight edge 5 held radially against the tire, in the middle of the deformed portion of the tire, will touch strips 1 and 2, Figure 3, and will also be tangent to the portion of the side wall 3 bounded by strips 1 and 2 as at 6.

If the tire is under inflated, the deformation of the side walls 3 is greater than it is in the case of proper inflation and a straight edge 5, Figure 4, held radially against the portion of the side wall 3 bounded by strips 1 and 2 at a point in the middle of the deformed portion of the tire, as at 6, will touch only one strip, either strip 1 or strip 2.

If the tire is over inflated, the deformation of the side walls 3 is less than it is in the case of proper inflation and a straight edge 5, Figure 5, held radially against strips 1 and 2 at points in the middle of the deformed portion of the tire, will not touch side wall 3.

Strips 1 and 2 may be made of any suitable resilient material either integral with the tire or separately and fastened to the tire by any suitable means.

My invention may also consist of three or more circular strips concentrically located on one or both side walls of a tire as in Figure 6 which shows four strips, 7, 8, 9, and 10. Figure 6 is a cross sectional view of the deformed portion of a tire supporting a load 4 and properly inflated. A straight edge 5 held radially against the tire in the middle of the deformed portion touches all four strips. In case the tire is under inflated, straight edge 5, held radially against the tire in the middle of the deformed portion of the tire, will touch only two of the strips at a time, that is, it will touch strips 7 and 8, 8 and 9, or 9 and 10. In case the tire is over inflated, straight edge 5, held radially against the tire in the middle of the deformed portion of the tire, will touch strips 7 and 10 but will not touch strips 8 and 9.

My invention may also consist of one circular strip concentrically located on one or both side walls of a tire as shown at 11, Figure 7. Here strip 11 is of sufficient width to permit the outer surface to be formed to a radial curvature such that when the tire is supporting load 4 and is properly inflated, the radial curvature of strip 11 in the middle of the deformed portion of the tire will be zero as shown by straight edge 5, Figure 7. In case of under inflation, the outer surface of strip 11 will be convex radially in the middle of the deformed portion of the tire and in case of over inflation, the outer surface of strip 11 will be concave radially in the middle of the deformed portion of the tire.

My invention may also be used to visually determine the actual pressure in a tire, within reasonable limits of accuracy, when the load is known.

Similarly, the load may be approximately determined when the internal pressure is known.

In determining the condition of inflation of a tire or its load by the means herein provided, any straight edge may be used. However, the deformation of the tire side wall may be determined with the eye alone, by means of the invention herein disclosed.

When a tire manufacturer specifies the air pressure to be carried in his product, which is the present practice, he must base his recommendation on some average value for the weight to be supported. If the weight actually supported is more than this average value, his recommended pressure is too low and the tire is distorted more than it should be causing difficult handling of the vehicle and undue deterioration of the tire. On the other hand, if the actual load is less than his assumed value the pressure is too high, riding comfort is impaired and the tire is injured by being less resilient to irregularities in the road. From this viewpoint, it seems that the criteria for judging the condition of inflation of a tire should be its distortion under load rather than the pressure of the air within the tire.

From the foregoing description taken in connection with the accompanying drawings, it will be apparent to those skilled in the art that I provide a novel means for determining the condition of inflation of a pneumatic tire.

I claim as my invention:

1. In a pneumatic tire subject to deformation by a load on said tire, circular strips of resilient material integral and concentric with said tire and located on the outer side wall of said tire, the arrangement of said strips and said side wall being such that, when said tire is properly inflated for the load being supported, a straight line intersecting the axis of said tire and touching the outer surfaces of said strips at points in the middle of the deformed section of said tire, will be tangent to said side wall.

2. In a pneumatic tire subject to deformation by a load on said tire, circular strips of resilient material integral and concentric with said tire and located on the outer side wall of said tire, the arrangement of said strips and said side wall being such that, when said tire is under inflated for the load being supported, a straight line intersecting the axis of said tire and tangent to said side wall at a point in the middle of the deformed section of said tire will not touch both of said strips.

3. A pneumatic tire subject to deformation by the application of a load, said tire including a deformable external indicator, said indicator consisting of a side wall of said tire and at least two circular strips integral with said side wall, the arrangement being such that the outermost surfaces of said side wall and circular strips lie in the same plane at the point of maximum deformation when said tire is supporting a load and is properly inflated.

4. A pneumatic tire subject to deformation by the application of a load, said tire including a deformable external indicator, said indicator consisting of at least three circular strips concentric with said tire and integral with a side wall of said tire, the arrangement being such that the outermost surfaces of said strips lie in the same plane at the point of maximum deformation when said tire is supporting a load and is properly inflated.

5. A pneumatic tire subject to deformation by the application of a load, said tire including deformable external indicators, said indicators consisting of a side wall of said tire and at least two projections on said side wall, the arrangement being such that the outermost surfaces of said side wall and projections lie in the same plane at the point of maximum deformation when said tire is supporting a load and is properly inflated.

6. A pneumatic tire subject to deformation by the application of a load, said tire including a deformable external indicator, said indicator consisting of at least two circular strips on the side wall of said tire, the arrangement being such that the outermost surfaces of said strips lie in the same plane with at least one point on the surface of said side wall in the middle of the deformed portion of said tire when said tire is supporting a load and is properly inflated for the load being supported.

7. A pneumatic tire subject to deformation by the application of a load, said tire including a deformable external indicator, said indicator consisting of at least two projections on the side wall of said tire, the arrangement being such that the outermost surfaces of said projections lie in the same plane with at least one point on the surface of said side wall in the middle of the deformed portion of said tire when said tire is supporting a load and is properly inflated for the load being supported.

8. A pneumatic tire including side walls subject to deformation by the application of a load, at least one of said side walls being so constructed that at least two portions thereof are relatively thicker than the side wall lying between said portions, the arrangement being such that the outside surfaces of said portions will lie in the same plane with at least one point on the outside surface of said side wall lying between said portions in the middle of the deformed part of said side wall when said tire is properly inflated for the load being supported.

CHARLES HAMPTON McRAVEN.